United States Patent
Farmont

[11] Patent Number: 6,012,767
[45] Date of Patent: Jan. 11, 2000

[54] LOUVER ARRANGEMENT FOR VEHICLE SUN ROOFS

[75] Inventor: Rolf Farmont, Dusseldorf, Germany

[73] Assignee: Meritor Light Vehicles Systems, Inc., Dusseldorf, Germany

[21] Appl. No.: 08/956,773

[22] Filed: Oct. 21, 1997

Related U.S. Application Data

[63] Continuation-in-part of application No. 08/624,882, Mar. 27, 1996.

[30] Foreign Application Priority Data

Mar. 29, 1995 [DE] Germany ............. 295 05 192 U

[51] Int. Cl.[7] .................................................. B60J 7/00
[52] U.S. Cl. .................. 296/214; 296/220.01; 160/201; 160/202; 49/125
[58] Field of Search ............... 296/214, 220.01; 49/63, 125; 160/201, 202

[56] References Cited

U.S. PATENT DOCUMENTS

| | | |
|---|---|---|
| 1,387,062 | 8/1921 | Marshall . |
| 2,497,419 | 2/1950 | Schwartz . |
| 2,853,340 | 9/1958 | Hershberger . |
| 3,845,591 | 11/1974 | Stine ........................ 160/202 |
| 3,906,669 | 9/1975 | Vorguitch ..................... 49/63 |
| 4,068,699 | 1/1978 | Tucker ........................ 160/202 |
| 4,286,821 | 9/1981 | Cooper . |
| 4,537,442 | 8/1985 | Jardin . |
| 4,852,938 | 8/1989 | Hirshberg et al. . |
| 5,197,779 | 3/1993 | Mizuno . |
| 5,447,355 | 9/1995 | Kelm . |
| 5,603,372 | 2/1997 | Farmont et al. . |
| 5,632,523 | 5/1997 | Kelm . |
| 5,671,969 | 9/1997 | Sutor et al. . |
| 5,816,647 | 10/1998 | Farmont ............... 296/220.01 |

FOREIGN PATENT DOCUMENTS

| | | |
|---|---|---|
| 208672 | 1/1957 | Australia . |
| 353695 | 7/1989 | European Pat. Off. . |
| 3223136 | 3/1983 | Germany ............... 296/214 |
| 3801881 | 1/1991 | Germany . |
| 4127624 | 9/1992 | Germany . |
| 4329583 | 10/1994 | Germany . |
| 4404618 | 3/1995 | Germany . |
| 4-90924 | 3/1992 | Japan . |
| 571641 | 1/1976 | Switzerland . |
| 349172 | 5/1931 | United Kingdom . |
| 573355 | 11/1945 | United Kingdom . |

*Primary Examiner*—Dennis H. Pedder
*Attorney, Agent, or Firm*—Vickers Daniels & Young

[57] ABSTRACT

A louver arrangement for a vehicle sun roof designed to limit sun into the vehicle and to limit the vibration of the louvers. The louver arrangement has two or more louvers that are guided between parallel guide profiles. At least one louver has a deviating longitudinal radius of curvature such that when the louver is in the closed position at least one portion of the louver is fastened to a component perpendicular to the plane of the sun roof opening.

57 Claims, 4 Drawing Sheets

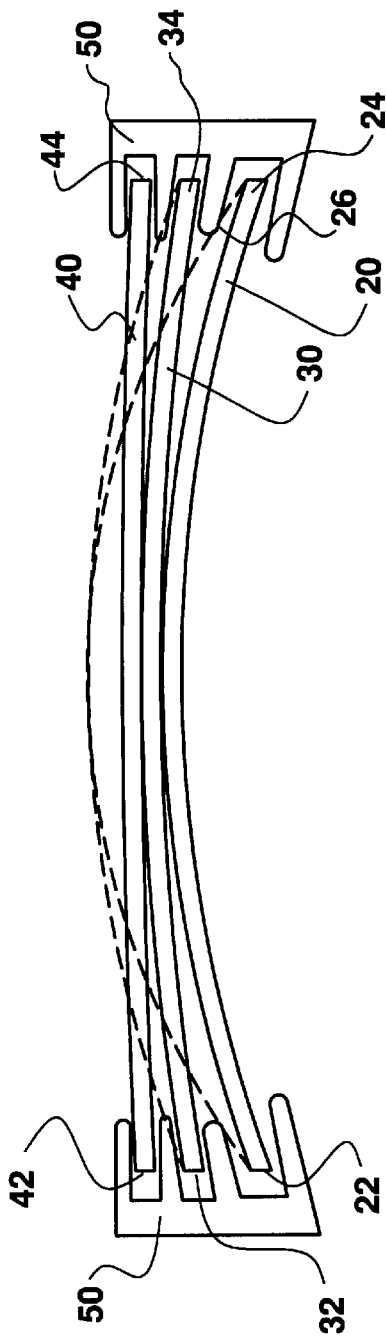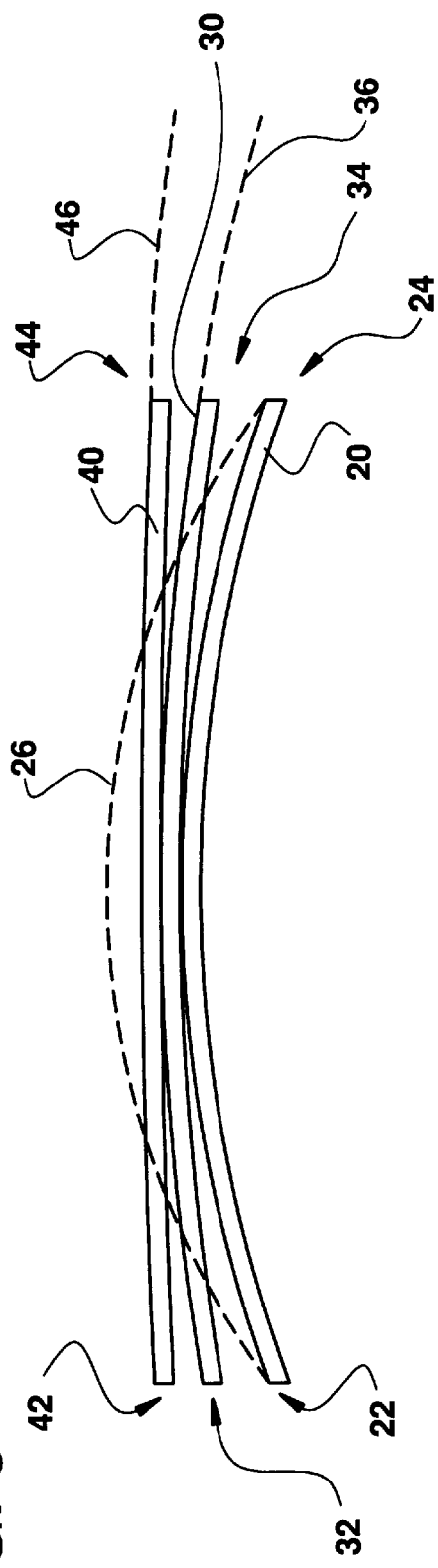

LOUVER ARRANGEMENT FOR VEHICLE SUN ROOFS

This patent application is a continuation-in-part of U.S. patent application Ser. No. 08/624,882 filed Mar. 27, 1996 entitled "Louver Arrangement for Vehicle Sun Roofs" which in turn claims priority on German Patent Application No. 295 05 192.2 filed Mar. 29, 1995.

INCORPORATION BY REFERENCE

U.S. Letters Pat. Nos 4,852,938; 5,447,355; 5,603,372; 5,632,523 and 5,671,969 and U.S. patent application Ser. No. 08/624,882 filed Mar. 27, 1996; U.S. patent application Ser. No. 08/622,205 filed Mar. 27, 1996 and U.S. patent application Ser. No. 08/537,684 filed Jan. 19, 1996 illustrate various louver mounting arrangements and configurations in which the louvers of the present invention may be used and as such these references are incorporated herein by reference.

BACKGROUND OF THE INVENTION

The invention pertains to a louver arrangement. More particularly, the present invention pertains to a louver arrangement for a vehicle, and more specifically to the art of a louver arrangement for sun roofs of a vehicle sun roof.

Past louvers have been primarily used as an adjustable covering over a vehicle sun roofs to prevent the entry of light through the sun roof. However, these louver arrangements have a tendency to vibrate when the vehicle is moving when the louver arrangement was partially or fully closed and the sun roof was open. Such vibrating of the louver arrangement sometimes resulted in the bending and/or buckling of one or more louvers thus damaging the louver arrangement. The vibrational movement of the louver arrangement also adversely affected the air flow through the louver arrangement as the vehicle is moving, thus increasing drag and impairing the movement of the vehicle.

As a result of the problems associated with louver arrangements, there has been a demand for a louver arrangement that can be used in vehicles which prior louver arrangement reduces or overcomes the limitations associated with prior louver arrangements.

SUMMARY OF THE INVENTION

The invention particularly relates to a louver arrangement for use with a vehicle and more specifically a louver arrangement for use in a vehicle sun roof and will be described with particular reference to such applications and uses; however, the invention has much broader application and can be used in a wide variety of applications such as for use in or with any type of opening or window.

The louver arrangement of the present invention may be used in all types of vehicle openings or windows such as sun roofs, side and rear windows. For example, the present invention may be used in vehicles having sliding roofs with a cover plate that can be shifted beneath the roof covering of a vehicle roof, spoiler roofs with a cover plate that can be moved upward from the roof opening and backward in the direction of travel of the vehicle, lifting roofs, folding roofs, as well as other types of openable hatches in vehicles.

The present invention pertains to a louver and a louver arrangement which suppresses and/or eliminates the vibration and/or buckling problems of prior designs for louver arrangements used in vehicles. Specifically, the present invention pertains to a louver arrangement for a vehicle sun roof which reduces entry of light into the vehicle via the sun roof and suppresses the vibrations of the louver that occur during vehicle operation. In accordance with the invention, there is provided a louver arrangement for vehicle sun roofs, particularly for transparent vehicle sun roofs, which includes at least two louvers that are positioned between at least two regions in the sun roof. Preferably, the louvers are movable between the regions such as being guided between fixed guide profiles. When the louvers are moved to close the opening in the sun roof, the louvers are referred to as being in the closed position. When the louvers are positioned so as not to cover the opening in the sun roof, the louvers are referred to as being in the open or stacked position. Preferably, the guide profiles are spaced at an essentially constant spacing. Each of the louvers have a natural radius of curvature which is defined as the radius of curvature of the louver when the louver is not fixed at its ends. As can be appreciated, the natural radius of curvature for louvers that are essentially planar or flat will approach infinity. At least one louver which is positioned between the regions in the sun roof has a longitudinal radius of curvature which is less that the natural radius of curvature of the louver.

In accordance with another aspect of the present invention, the louver arrangement for a vehicle sun roof includes at least a first and a second louver, wherein the first and second louvers are guided between at least two guide profiles which are preferably fixed in position and are positioned substantially parallel to one another. The louvers are movable between an extended or closed position and a collapsed, stacked or open position. The louvers are positioned in a substantially stacked orientation when in the collapsed position and in such position the first louver is at least partially positioned above the second louver. Each of the louvers has a longitudinal axis extending between the guide profiles and the longitudinal radius of curvature of the second louver in the guided position between the guide profiles is larger than the natural longitudinal radius of curvature of the second louver. The first louver typically has a longitudinal radius of curvature in the guided position which larger than the longitudinal radius of curvature of the second louver in the guided position. If more than two louvers are included in the louver arrangement, the radius of curvature of the louvers in the guided position preferably reduces progressively from the above positioned louver in the stacked position. The additional louver(s) may have a longitudinal radius of curvature in the guided position which is larger than the natural longitudinal radius of curvature for the additional louver(s). Using this type of louver arrangement, is it possible, among other things, to make the louvers lighter such as by making the louver thinner and/or by using lighter weight materials, and to also arrange the louvers in a closer spacing relationship. The louver arrangement advantageously increases the torsional rigidity of each louver especially in the longitudinal direction of the louver, thereby resulting in reduced buckling and/or vibrational tendencies, especially when the vehicle is moving at high speeds. The louver arrangement also resists bending and/or buckling when the louvers are in the closed or extended position. When the louvers are in the closed position thereby closing off the roof opening, air flows between the louvers when the vehicle is moving. This air flow between the louvers produces forces which have historically caused the louvers to vibrate and in some instances bend and/or buckle. This vibrating, bending and/or buckling of the louvers adversely affects the ventilation characteristics of the louver arrangement. The louver arrangement of the present invention is design to address these problems and reduce or suppress vibration, bending and/or buckling of the louvers.

In accordance with another aspect of the present invention, the longitudinal radius of curvature of at least the first and second louvers crest at a point which is at substantially the equal distance between the guide profiles. The curvature crest of the second louver is positioned below the curvature crest of the first louver when in the guided position.

In accordance with still another aspect of the present invention, the curvature crest of at least one louver that is positioned below the first louver is positioned above the curvature crest of the first louver when the first louver is in the guided position and the at least one other louver is in an unguided position between the guide profiles.

In accordance with still another aspect of the present invention, the first louver is substantially flat along its longitudinal axis when in the guided position In accordance with another aspect of the present invention, the louver arrangement includes a third louver guided between the two profiles and is positioned below the second louver when in the stacked position. The third louver has a natural longitudinal radius of curvature which is less than the longitudinal radius of curvature of the third louver in the guided position.

In accordance with yet another aspect of the present invention, the third louver has a curvature crest positioned substantially in the middle of the guide profiles when the third louver is in the guided position. The curvature crest of the third louver is positioned below the curvature crest of the second louver when the second and the third louver in the guided position. The curvature crest of the third louver at least extends up to the first louver when the first louver is in the guided position and the third louver is in an unguided position between the guide profiles.

In accordance with another aspect of the present invention, the louver arrangement includes a guide arrangement for mutual guiding of the louvers. The guide arrangement is preferably positioned between at least two louvers. In addition, the guide arrangement is preferably positioned between the guide profiles. The guide arrangement can include a variety of designs and configurations. One such design incorporated a sliding surface positioned on at least one louver which forms an elongated guide track arranged substantially parallel to at least two of the guide profiles, and an adjacently position louver includes a surface engager. The surface engager is designed to engage the sliding surface of at least one adjacently positioned louver. The guide arrangement is designed to guide and/or control the position of at least two louvers with respect to one another. The guide arrangement also is designed to reduce or suppress vibrations and/or buckling of the louvers. The guide arrangement further can be used to regulate the radius of curvature of the louver in the longitudinal and/or lateral axis of the louver. The guide arrangement also facilitates in the rigidity of the louver arrangement. As can be appreciated, many guide arrangements can be used. Such guide arrangements include, but are not limited to, a pin and slot arrangement, a sliding rail arrangement, wheel and/or roller bearing track arrangement, and the like. The guide arrangement may also be used to control and/or enhance the ventilation properties of the louver arrangement by controlling the spacing between at least two louvers.

In accordance with yet another aspect of the present invention, each of the louvers has a latitudinal axis which is substantially perpendicular to the longitudinal axis of the louver, and at least one of the louvers has a non-planar surface along the latitudinal axis of said louver. Defined in another manner, the longitudinal radius of curvature of the louver varies over the latitudinal axis of at least one louver.

In summary, there is provided a louver arrangement for vehicle sun roofs, especially transparent ones, with at least two louvers that are guided between fixed guide profiles at essentially constant spacing. The louvers are in a substantially stacked orientation in said collapsed, stacked or open position wherein the first louver is at least partially positioned above the second louver, and each of the louvers have a longitudinal axis extending between the guide profiles and a natural longitudinal radius of curvature. The longitudinal radius of curvature of the second louver in the guided position between the guide profiles is preferably larger than the natural longitudinal radius of curvature of the second louver. At least one louver has a deviating longitudinal radius of curvature in itself and/or relative to the other louver(s) so that one part of the louver is fastened to a component perpendicular to the plane of opening at least in the state in which the roof opening is closed. Preferably, the lowermost louver has a smaller longitudinal radius of curvature than at least one of the louvers arranged above it. Preferably, the longitudinal radius of curvature of the louvers crest at a point which is substantially equal distance between the guide profiles. The curvature crest of the second louver is positioned below the curvature crest of the first louver when in the guided position. The curvature crest of at least one louver positioned below the first louver is positioned above the curvature crest of the first louver when the first louver is in the guided position and the other louver is in an unguided position between the guide profiles. Preferably, at least one louver has a greater longitudinal radius of curvature in its front region in the direction of travel than in its rear region and a second louver is arranged beneath this first louver so that the first louver is fastened to the top of the second louver with its front region in the direction of travel and in contact with it at least in the state in which the sun roof opening is closed. The louver arrangement also preferably includes a spacer or guide elements for mutual guiding of louvers and such elements are arranged between at least two louvers. Preferably, the spacer or guide elements have sliding surfaces that form elongated guide tracks arranged parallel to the fixed guide profiles.

The aforementioned components which are used in the present invention are not subject to any special exceptional conditions in terms of size, shape, choice of material and technical design. Additional details, characteristics and advantages of the object of the invention follow from the subsequent description of the drawings in which preferred variants of the louver arrangement according to the invention are presented.

BRIEF DESCRIPTION OF THE DRAWINGS

Reference may now be made to the drawings, which illustrate various embodiments that the invention may take in physical form and in certain parts and arrangements of parts wherein:

FIG. 2 illustrates a louver arrangement having three louvers positioned between two guide profiles viewed from the rear of the vehicle;

FIG. 3 illustrates another embodiment of the present invention which has three louvers viewed in the same manner as shown in FIG. 2;

DETAILED DESCRIPTION OF PREFERRED EMBODIMENTS

Figure 1:
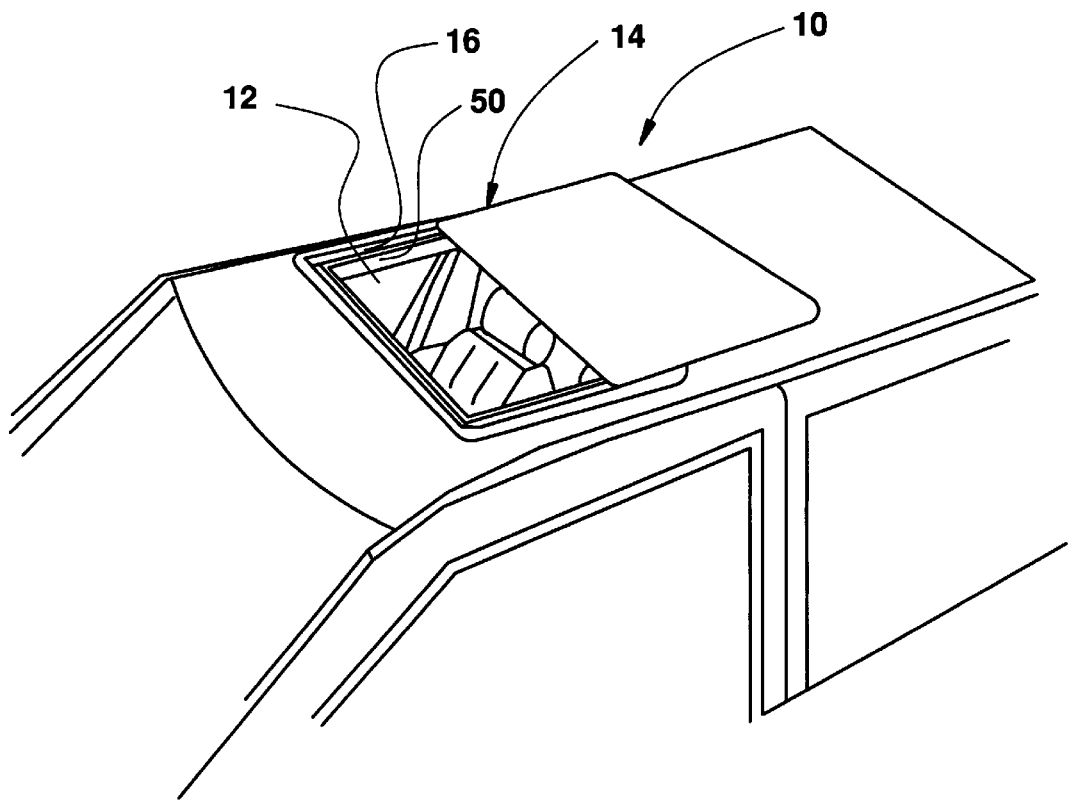
FIG. 1 illustrates a typical sun roof of a vehicle with the sun roof in the open position.

Referring now to the drawings, wherein the showings are for the purpose of illustrating the preferred embodiments of the invention only and not for the purpose of limiting the same, FIG. 1 illustrates a vehicle 10 which includes a typical sun roof opening 12 that can be covered and uncovered by a sun roof plate 14. The sun roof plate is guided within the sun roof by plate guide 16 positioned on each side of the sun roof. FIGS. 2–5 illustrate three louvers 20, 30 and 40 which are guided at their longitudinal ends 22, 24, 32, 34, 42, 44, respectively, between fixed guide profiles 50 that are positioned at essentially constant spacing. Guide profiles 50 is a preferably a standard guide design; however, many different shaped and configured guide profiles can be used for use in a variety of sunroof configurations. The position that the specific louvers would assume in the unfastened stated, for example, in the absence of other louvers, is indicated with a dashed line (26, 36, 46) in FIGS. 2 to 5.

In the practical examples depicted in FIG. 2, the lowermost louver 20 has the smallest longitudinal radius of curvature of the three louvers 20, 30 and 40, especially in the unfastened state. The longitudinal radius of curvature of the louver 30 is larger than louver 20, whereas the uppermost louver 40 is designed to be substantially flat in the unfastened state. The arcs of the two louvers 20 and 30 have longitudinal radii of curvature which are designed so that the crests of these louvers in the unfastened state lie above the uppermost louver 40, as shown by dashed lines 26 and 36 in FIG. 2. In the fastened state, the uppermost louver 40 presses against the underlying louvers 20 and 30 and in this fashion causes fastening of the louvers according to the invention.

However, it is also conceivable, as shown in FIG. 3, to design the two uppermost louvers 30 and 40 in a substantially parallel configuration. In the depicted practical example, the two louvers 30 and 40 have a slight longitudinal radius of curvature, as indicated by lines 36 and 46, respectively. However, it is also conceivable to design louvers 30 and 40 substantially flat. The lowermost louver 20 has an arc shape which has a smaller longitudinal radius of curvature, as indicated by line 26, so that in the unfastened state, its crest lies above the uppermost louver 40.

Figure 6:
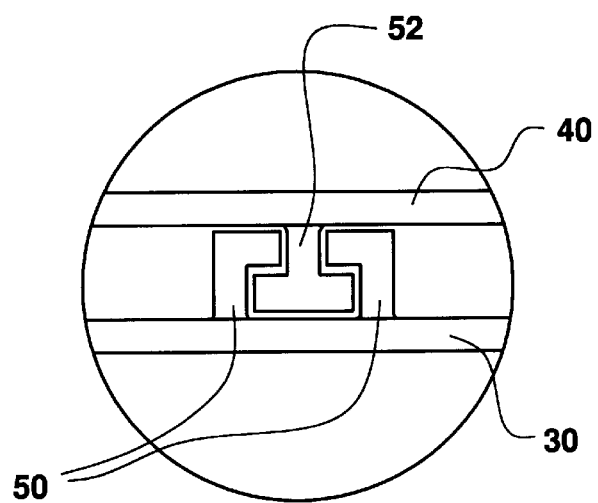
FIG. 6 illustrates a specific type of spacer and/or guide element which can be used to facilitate in the movement of the louvers in relation to one another and/or to rigidify the louver arrangement.
Figure 4:
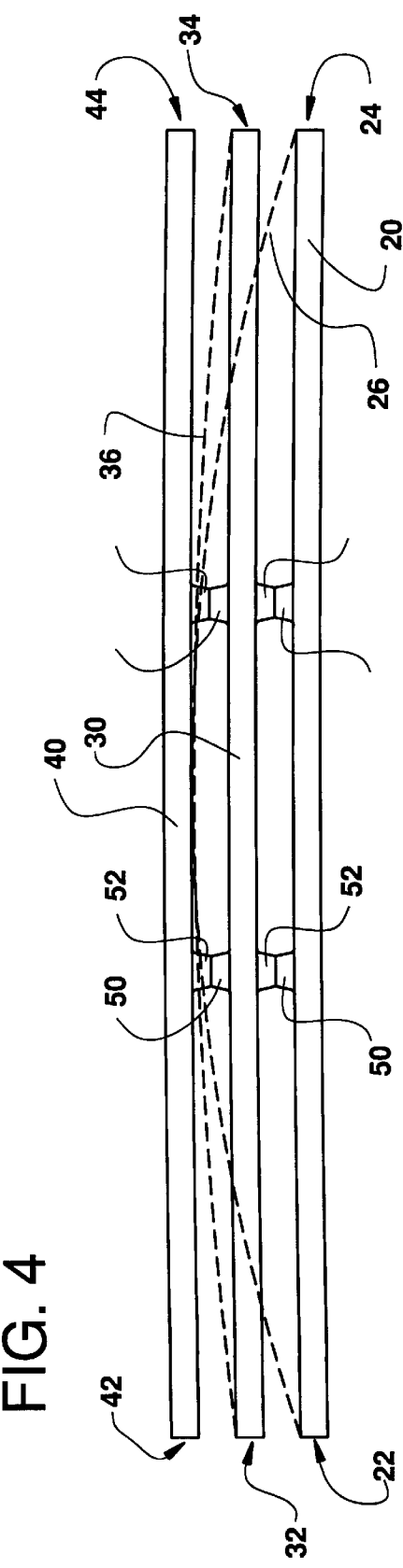
FIG. 4 illustrates a louver arrangement similar to that of FIG. 2 but further illustrates spacer and/or guide elements positioned between the louvers.
Figure 5:
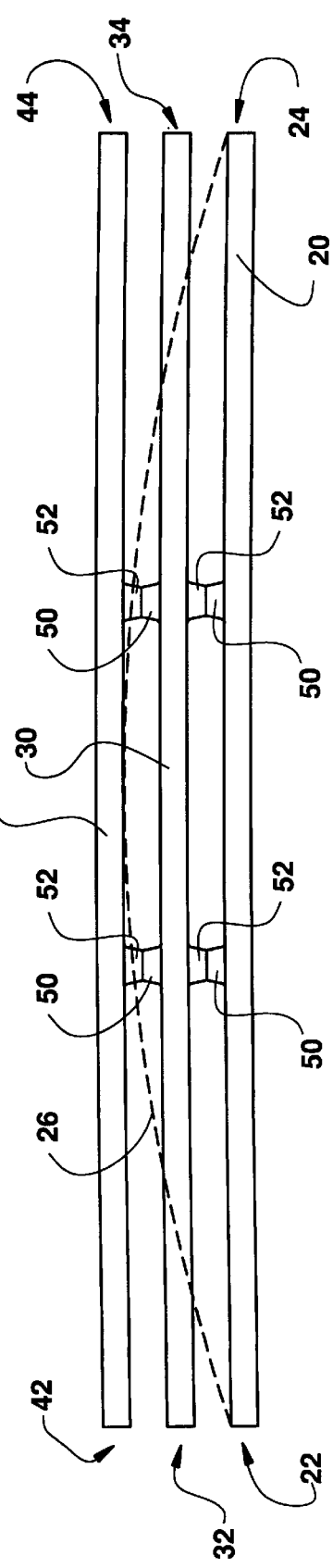
FIG. 5 illustrates a louver arrangement similar to that of FIG. 3 but further illustrates spacer and/or guide elements positioned between the louvers.

The longitudinal radius of curvature ratios of the practical examples depicted in FIG. 4 correspond essentially to the practical example depicted in FIG. 2, except that the longitudinal radii of curvature of the arc shapes of lower louvers 20 and 30, as indicated by lines 26 and 36, respectively, are chosen so that the crests of louvers 20 and 30 lie roughly at the height of the uppermost louver 40 in the fastened state. In the unfastened state, the uppermost louver 40 is designed substantially flat. In order to improve the ventilation properties of this louver arrangement, spacer and/or guide elements 50, 52 are arranged between the louvers as shown in FIG. 4–6. These spacer and/or guide elements 50, 52 are designed so that louvers 20, 30 and 40 are preferably arranged substantially parallel to each other in the fastened state; however, the guide elements can arrange the louvers is other positions as needed. It is understood that the optical appearance of this louver arrangement can be adjusted by those expedient to the aesthetic demands of symmetry.

The same holds true for the louver arrangement according to FIG. 5 in which the upper louvers 30 and 40 are designed flat in the unfastened state and louver 20 has a longitudinal radius of curvature in the unfastened state which is less than the longitudinal radius of louvers 30 and 40, as indicated by line 26.

It is understood that the spacer and/or guide elements 50, 52 can all have characteristics for this type of guiding that can be gathered from the prior art. In particular, the spacer and/or guide elements 50, 52 can have sliding surfaces that form elongated guide tracks arranged parallel to the fixed guide profiles. It can be advantageous for these sliding surfaces to face the neighboring louver, as shown in FIGS. 4–5. It is also conceivable that the interacting spacer and/or guide elements 50, 52 form a shape-mated joint in pairs as illustrated in FIG. 6. The spacer or guide elements are designed to preferably maintain a desired spacing between one or more louvers. The spacer or guide elements are also preferably designed to rigify the louver with respect to one another so as to reduce bending and/or buckling of the louvers. The spacer guide elements may also be used to assist in defining the movement of the louvers with respect to one another. As specifically shown in FIG. 6, spacer 52 is a T-shaped member which is mounted to the base of louver 40. T-shaped member 52 preferably extends substantially the complete latitudinal length of louver 40. Spacer 50 is shown to be an L-shaped member mounted on the top of louver 30. Two L-shaped members 50 preferably extend substantially the complete latitudinal length of louver 30. As can be appreciated, only one L-shaped member 50 can be used to effectively guide the louvers with respect to one another. Alternatively, or additionally, the L-shaped member 50 and/or the T-shaped member 52 only partially extends the latitudinal length of the louver.

Figure 7:
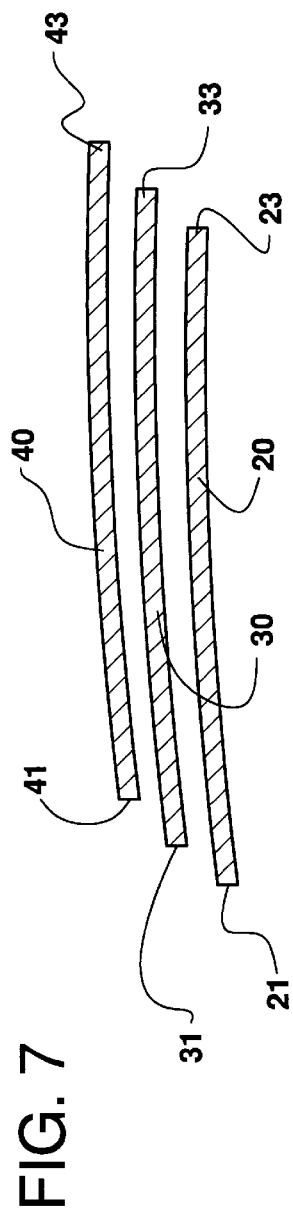
FIG. 7 illustrates another embodiment of the present invention which has three louvers viewed along line VIII—VIII of FIG. 9.
Figure 8:
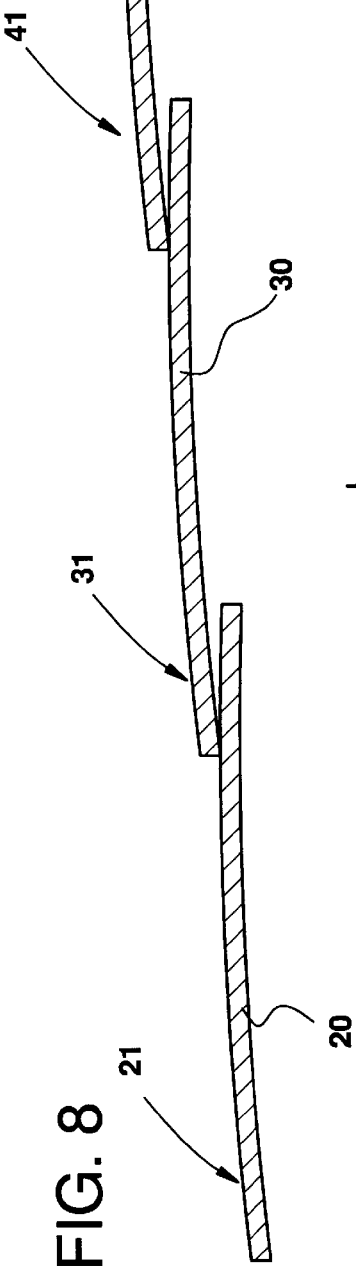
FIG. 8 illustrates the louver arrangement of FIG. 7 in the position by which the louvers cover the opening in the top of the sun roof.
Figure 9:
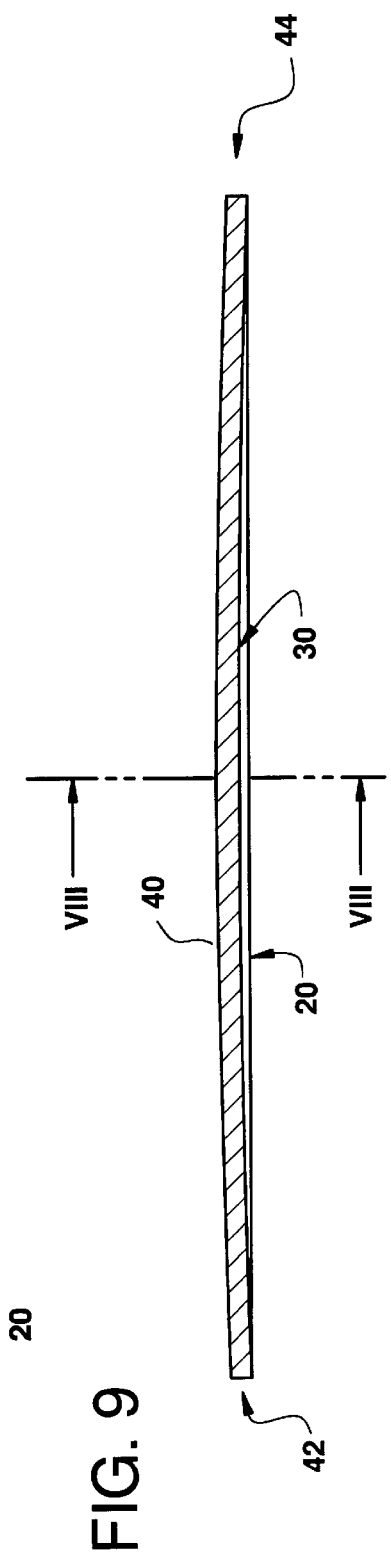
FIG. 9 illustrates a louver arrangement of FIG. 7 viewed from the front of the vehicle.

In the practical example depicted in FIGS. 7–9, the three superimposed louvers 20, 30 and 40 each has a different longitudinal radius of curvature. In the front region 21, 31 and 41 of louvers 20, 30 and 40, respectively, the longitudinal radius of curvature is greater that in the rear regions 23, 33 and 43 of louvers 20, 30 and 40, respectively. The ratio of these longitudinal radii of curvature of each louver is configured so that the louvers 20, 30 and are arranged at a spacing from each other in the state in which the roof opening is exposed as shown in FIG. 7, whereas in the state in which the roof opening is closed they are fastened and/or connected with the underlying louver 20 and/or 30 with their rear region as shown in FIG. 8.

Troublesome flapping noises can also be avoided in particular by fastening of the louvers according to the invention.

In summary, the present invention pertains to a novel louver arrangement for a vehicle designed to increase the torsional rigidity of the louvers to withstand high driving speeds and to further suppress vibrations during driving. The louver can be designed to be used to cover a vehicle roof, a spoiler roof, covers for hatchbacks, etc. In order to accomplish these objectives, the louver arrangement incorporates specially configured louvers. In one aspect of the invention, the louver arrangement includes two or more louvers positioned between two fixed guide profiles which are substantially parallel to one another. The louvers are preferably moveably mounted between two guide profiles so that the louvers can be moved between a collapsed and extended position. In the collapsed position, the louvers are oriented in a substantially stacked position. For instance, a louver arrangement which is designed to be used in a sunroof of a vehicle, the collapsed position allows access to the opening in the sunroof whereas the fully extended position would cover the opening in the sunroof. Each of the louvers include a longitudinal axis which extends between the two guide profiles and is preferably substantially perpendicular to the two guide profiles. The louvers also include a latitudinal axis which is substantially perpendicular to the longitudinal axis. Each of the louvers also includes a natural longitudinal radius of curvature. The natural longitudinal radius of curvature is a radius of curvature of the louver in its unmounted or natural form. The louver arrangement of the present invention obtains the desired rigidity and reduction in vibration of the louvers by selecting louvers with a specially selected natural longitudinal radius of curvature. The top or first louver, when mounted between the two guide profiles, preferably has the largest longitudinal radius of curvature. To create the desired rigidity and reduced vibrational tendencies of the louver arrangement, at least one louver located beneath the top or first louver is mounted in a stressed state. As best illustrated in FIGS. 2 and 3, the second louver, or louvers located beneath the first or top louver, has a natural radius of curvature indicated by dash lines 26 and 36, which if positioned between the fixed guide profiles in an unmounted position, crest above the first or top louver. The stressed state of louver 30 is obtained by causing the louver to be mounted between the fixed guide profiles in such a way that the crest of the longitudinal radius of curvature of the second louver is less than or equal to the base of the first or top louver when the second louver is in the guided position. As is also illustrated in FIG. 2, the bottom louver is also similarly mounted in a stressed relationship with respect to the second louver. As can be appreciated, by mounting the louvers below the top louver in a stress relationship, the louvers are in a more rigid state between the guide profiles and this rigid state resists vibrations during the moving of a vehicle. In another aspect of the present invention, the rigidity of the louvers and reduced vibration of the louvers can be enhanced by the use of a guide arrangement positioned between one or more louvers. Such a guide arrangement is illustrated in FIGS. 4 and 5. Preferably, the guide arrangement includes sliding surfaces that form elongated guide tracks which guide tracks are arranged substantially parallel to the two guide profiles of the louver arrangement. One or more guide arrangements are preferably used between each of the louvers as illustrated in FIGS. 4 and 5 to create a more rigid system which reduces vibrations during the operation of the vehicle. In another aspect of the present invention, the vibration of the louvers is reduced by altering the air flow over the louvers as the vehicle is moving. Specifically, the louvers are designed so as to minimize the tendency of air to flow between the louvers which can cause vibrations. This objective is accomplished by forming the louvers to have a non-planar profile in the latitudinal axis of the louver. This non-planar profile is illustrated in FIG. 7–9. As is best illustrated in FIG. 8, the louvers are designed such that when the louvers are in an extended position, the spacing between the louvers at the top surface of the louvers is minimized so as to reduce the amount of air which travels between the louvers thereby reducing the amount of vibration between the louvers.

The invention has been described with reference to a preferred embodiment and alternates thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. A louver arrangement for a vehicle sun roof comprising a first and a second louver, said first and second louvers spaced and guided between two fixed guide profiles positioned substantially parallel to one another, said first and second louvers movable between an extended and a collapsed position, said louvers being in a substantially stacked orientation in said collapsed position wherein said first louver is at least partially positioned above said second louver, each of said first and second louvers having a longitudinal axis extending between said two guide profiles and an unstressed longitudinal radius of curvature, and said longitudinal radius of curvature of said second louver in said guided position between said two guide profiles being larger than said unstressed longitudinal radius of curvature of said second louver by downward contact of said first louver therewith.

2. A louver arrangement as defined in claim 1, wherein said first and second louvers cresting at a point which is substantially equal distance between said two guide profiles, said curvature crest of said second louver positioned below said curvature crest of said first louver when in said guided position.

3. A louver arrangement as defined in claim 2, wherein said curvature crest of said second louver formed by the unstressed radius of curvature of said second louver being positioned above said curvature crest of said first louver when said first louver is in said guided position.

4. A louver arrangement as defined in claim 1, wherein said first louver being substantially flat along said longitudinal axis when in said guided position.

5. A louver arrangement as defined in claim 3, wherein said first louver being substantially flat along said longitudinal axis when in said guided position.

6. A louver arrangement as defined in claim 1, including a third louver guided between said two guide profiles and positioned below said second louver in said stacked position, said third louver having an unstressed longitudinal radius of curvature, said longitudinal radius of curvature of said third louver in said guided position being larger than said unstressed longitudinal radius of curvature of said third louver by downward contact of said second louver therewith.

7. A louver arrangement as defined in claim 3, including a third louver guided between said two guide profiles and positioned below said second louver in said stacked position, said third louver having an unstressed longitudinal radius of curvature, said longitudinal radius of curvature of said third louver in said guided position being larger than said unstressed longitudinal radius of curvature of said third louver by downward contact of said second louver therewith.

8. A louver arrangement as defined in claim 5, including a third louver guided between said two guide profiles and positioned below said second louver in said stacked position, said third louver having an unstressed longitudinal radius of curvature, said longitudinal radius of curvature of said third louver in said guided position being larger than said unstressed longitudinal radius of curvature of said third louver by downward contact of said second louver therewith.

9. A louver arrangement as defined in claim 6, wherein said second and third louvers have a curvature crest positioned substantially in the middle of said two guide profiles when in said guided position, said curvature crest of said third louver positioned below said curvature crest of said second louver when said second and said third louvers are in said guided position.

10. A louver arrangement as defined in claim 7, wherein said third louver has a curvature crest positioned substantially in the middle of said two guide profiles when in said guided position, said curvature crest of said third louver positioned below said curvature crest of said second louver when said second and said third louver in said guided position.

11. A louver arrangement as defined in claim 8, wherein said third louver has a curvature crest positioned substantially in the middle of said two guide profiles when in said guided position, said curvature crest of said third louver positioned below said curvature crest of said second louver when said second and said third louver in said guided position.

12. A louver arrangement as defined in claim 9, wherein said curvature crest formed by the unstressed longitudinal radius of curvature of said third louver at least extends up to said first louver when said first louver is in said guided position.

13. A louver arrangement as defined in claim 10, wherein said curvature crest formed by the unstressed longitudinal radius of curvature of said third louver at least extends up to said first louver when said first louver is in said guided position.

14. A louver arrangement as defined in claim 11, wherein said curvature crest formed by the unstressed longitudinal radius of curvature of said third louver at least extends up to said first louver when said first louver is in said guided position.

15. A louver arrangement as defined in claim 12, wherein said curvature crest formed by the unstressed longitudinal radius of curvature of said third louver is positioned above said first louver when said first louver is in said guided position.

16. A louver arrangement as defined in claim 13, wherein said curvature crest formed by the unstressed longitudinal radius of curvature of said third louver is positioned above said first louver when said first louver is in said guided position.

17. A louver arrangement as defined in claim 14, wherein said curvature crest formed by the unstressed longitudinal radius of curvature of said third louver is positioned above said first louver when said first louver is in said guided position.

18. A louver arrangement as defined in claim 1, including guide means for mutual guiding of louvers, said guide means positioned between at least two louvers and positioned between said two guide profiles.

19. A louver arrangement as defined in claim 3, including guide means for mutual guiding of louvers, said guide means positioned between at least two louvers and positioned between said two guide profiles.

20. A louver arrangement as defined in claim 17, including guide means for mutual guiding of louvers, said guide means positioned between at least two louvers and positioned between said two guide profiles.

21. A louver arrangement as defined in claim 18, wherein said guide means includes sliding surfaces that form elongated guide tracks arranged substantially parallel to said two fixed guide profiles.

22. A louver arrangement as defined in claim 19, wherein said guide means includes sliding surfaces that form elongated guide tracks arranged substantially parallel to said two fixed guide profiles.

23. A louver arrangement as defined in claim 20, wherein said guide means includes sliding surfaces that form elongated guide tracks positioned substantially parallel to said two fixed guide profiles.

24. A louver arrangement as defined in claim 1, wherein each of said louvers has a latitudinal axis substantially perpendicular to said longitudinal axis, at least one of said louvers having a varying longitudinal radius of curvature along said latitudinal axis of said louver.

25. A louver arrangement as defined in claim 3, wherein each of said louvers has a latitudinal axis substantially perpendicular to said longitudinal axis, at least one of said louvers having a varying longitudinal radius of curvature along said latitudinal axis of said louver.

26. A louver arrangement as defined in claim 6, wherein each of said louvers has a latitudinal axis substantially perpendicular to said longitudinal axis, at least one of said louvers having a varying longitudinal radius of curvature along said latitudinal axis of said louver.

27. A louver arrangement as defined in claim 23, wherein each of said louvers has a latitudinal axis substantially perpendicular to said longitudinal axis, at least one of said louvers having a varying longitudinal radius of curvature along said latitudinal axis of said louver.

28. A louver arrangement as defined in claim 24, wherein each of said louvers having a varying longitudinal radius of curvature along said latitudinal axis.

29. A louver arrangement as defined in claim 27, wherein each of said louvers having a varying longitudinal radius of curvature along said latitudinal axis.

30. A louver arrangement comprising a plurality of louvers spaced and guided between two fixed and substantially parallel guide profiles, said louvers movable between a collapsed and extended position, said louvers being in a substantially stacked orientation in said collapsed position wherein a top louver is positioned on the top of said stack and subsequent louvers are stacked at least partially beneath said top louver, each of said louvers having a longitudinal axis extending between said two guide profiles and an unstressed longitudinal radius of curvature, said top louver having the largest radius of curvature in said guided position, at least one of said louvers in said guided position having a longitudinal radius of curvature larger than said unstressed longitudinal radius of curvature of said at least one louver by downward contact of another of said louvers therewith.

31. A louver arrangement as defined in claim 30, wherein a louver stacked below said top louver has a stressed longitudinal radius of curvature in said guided position larger than its unstressed longitudinal radius of curvature by downward contact of said top louver therewith.

32. A louver arrangement as defined in claim 30, wherein each of said louvers includes a curvature crest position substantially in the middle of said two guide profiles, at least one of said louvers beneath said top louver having a curvature crest formed by the unstressed radius of curvature of said at least one louver which is positioned above the curvature crest of said top louver when said top louver is in said guided position.

33. A louver arrangement as defined in claim 31, wherein each of said louvers includes a curvature crest position substantially in the middle of said two guide profiles, at least one of said louvers beneath said top louver having a curvature crest formed by the unstressed radius of curvature of said at least one louver which is positioned above the curvature crest of said top louver when said top louver is in said guided position.

34. A louver arrangement as defined in claim 32, wherein said at least one louver positioned beneath said top louver is a bottom louver.

35. A louver arrangement as defined in claim 30, including guide means for mutual guiding of louvers, said guide means arranged between at least two louvers and positioned between said two guide profiles.

36. A louver arrangement as defined in claim 35, wherein said guide means includes sliding surfaces that form elongated guide tracks arranged substantially parallel to said two fixed guide profiles.

37. A louver arrangement as defined in claim 30, wherein each of said louvers has a latitudinal axis substantially perpendicular to said longitudinal axis, at least one of said louvers having a varying longitudinal radius of curvature along said latitudinal axis of said louver.

38. A louver arrangement as defined in claim 31, wherein each of said louvers has a latitudinal axis substantially perpendicular to said longitudinal axis, at least one of said louvers having a varying longitudinal radius of curvature along said latitudinal axis of said louver.

39. A louver arrangement as defined in claim 32, wherein each of said louvers has a latitudinal axis substantially perpendicular to said longitudinal axis, at least one of said louvers having a varying longitudinal radius of curvature along said latitudinal axis of said louver.

40. A louver arrangement as defined in claim 33, wherein each of said louvers has a latitudinal axis substantially perpendicular to said longitudinal axis, at least one of said louvers having a varying longitudinal radius of curvature along said latitudinal axis of said louver.

41. A louver arrangement as defined in claim 30, wherein each of said louvers having a varying longitudinal radius of curvature lying in said latitudinal axis.

42. A louver arrangement as defined in claim 40, wherein each of said louvers having a varying longitudinal radius of curvature lying in said altitudinal axis.

43. A louver arrangement comprising a plurality of louvers spaced and guided between two fixed and substantially parallel guide profiles, said louvers movable between a collapsed and extended position, said louvers being in a substantially stacked orientation in said collapsed position, each of said louvers having a longitudinal axis extending between said two guide profiles and a latitudinal axis substantially perpendicular to said longitudinal axis, at least one of said louvers having a varying longitudinal radius of curvature along said latitudinal axis of said louver.

44. A louver arrangement as defined in claim 43, wherein each of said louvers having a varying longitudinal radius of curvature along said latitudinal axis.

45. A louver arrangement as defined in claim 43, including guide means for mutual guiding of louvers, said guide means arranged between at least two louvers and positioned between said two guide profiles.

46. A louver arrangement as defined in claim 44, including guide means for mutual guiding of louvers, said guide means arranged between at least two louvers and positioned between said two guide profiles.

47. A louver arrangement as defined in claim 46, wherein said guide means includes sliding surfaces that form elongated guide tracks arranged substantially parallel to said two fixed guide profiles.

48. A louver arrangement as defined in claim 45, wherein said guide means includes sliding surfaces that form elongated guide tracks arranged substantially parallel to said two fixed guide profiles.

49. A louver arrangement as defined in claim 43, wherein each of said louvers has an unstressed longitudinal radius of curvature, at least one of said louvers in said guided position having a longitudinal radius of curvature larger than said unstressed longitudinal radius of curvature of said louver by downward contact of another of said louvers therewith.

50. A louver arrangement as defined in claim 44, wherein each of said louvers has an unstressed longitudinal radius of curvature, at least one of said louvers in said guided position having a longitudinal radius of curvature larger than said unstressed longitudinal radius of curvature of said louver by downward contact of another of said louvers therewith.

51. A louver arrangement as defined in claim 47, wherein each of said louvers has an unstressed longitudinal radius of curvature, at least one of said louvers in said guided position having a longitudinal radius of curvature larger than said unstressed longitudinal radius of curvature of said louver by downward contact of another of said louvers therewith.

52. A louver arrangement comprising a plurality of louvers spaced and mounted between two mounting profiles, said louvers oriented wherein a top louver is at least partially positioned above subsequent louvers, each of said louvers having a longitudinal axis extending between said two mounting profiles and an unstressed longitudinal radius of curvature, said top louver having the largest radius of curvature in said mounted position, at least one of said louvers positioned at least partially below said top louver having a longitudinal radius of curvature larger than said unstressed longitudinal radius of curvature of said at least one louver by downward contact of one of said plurality of louvers therewith.

53. A louver arrangement as defined in claim 52, wherein said louvers are movable mounted between a collapsed and extended position.

54. A louver arrangement as defined in claim 53, wherein said louvers being in a substantially stacked orientation in said collapsed position.

55. A louver arrangement as defined in claim 52, wherein said at least one louver beneath said top louver is a bottom louver.

56. A louver arrangement as defined in claim 52, wherein each of said louvers has a latitudinal axis substantially perpendicular to said longitudinal axis, at least one of said louvers having a varying longitudinal radius of curvature along said latitudinal axis of said louver.

57. A louver arrangement as defined in claim 56, wherein each of said louvers having a varying longitudinal radius of curvature lying in said latitudinal axis.

* * * * *

UNITED STATES PATENT AND TRADEMARK OFFICE
CERTIFICATE OF CORRECTION

PATENT NO. : 6,012,767
DATED : January 11, 2000
INVENTOR(S) : Rolf Farmont

It is certified that error appears in the above-identified patent and that said Letters Patent is hereby corrected as shown below:

On the title page:

Item [73], change "Assignee: Meritor Light Vehicles Systems, Inc., Dusseldorf, Germany" to --Assignee: Meritor Light Vehicles Systems, Inc., Troy, Michigan, U.S.A.--

Signed and Sealed this

Twenty-seventh Day of March, 2001

Attest:

NICHOLAS P. GODICI

Attesting Officer

Acting Director of the United States Patent and Trademark Office